United States Patent Office 3,254,095
Patented May 31, 1966

---

3,254,095
20-ARYL STEROID COMPOUNDS
Duane F. Morrow, Ann Arbor, Mich., assignor to Parke,
Davis & Company, Detroit, Mich., a corporation of
Michigan
No Drawing. Filed Dec. 9, 1963, Ser. No. 329,296
9 Claims. (Cl. 260—397.3)

This invention relates to novel chemical compounds and means for producing the same, and more particularly to 20-aryl steroids, viz., 20-phenyl-pregn-4-ene-3-one-20,21-diols and 17β-benzoylandrost-4-ene-3-ones having the respective Formulas I and II:

(I)
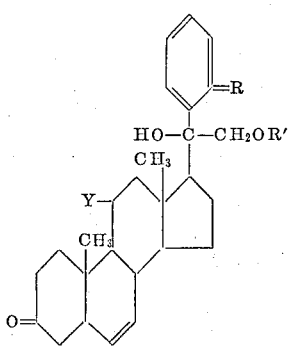

and (II)
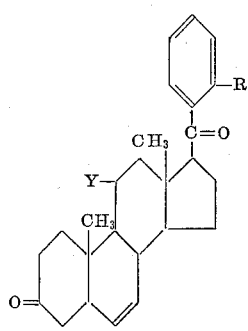

where R is a hydrogen or chlorine atom or a methyl or methoxy group, R' is hydrogen or a lower alkanoyl group (preferably containing up to five acyl carbon atoms), and Y is hydrogen or hydroxyl.

In accordance with the invention, phenylpregnene compounds having Formula I where R' is hydrogen are produced by reacting a corticosterone derivative of formula:

(III)
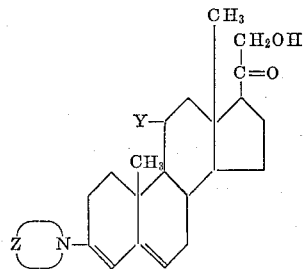

with a phenyl metal derivative of formula

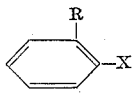

in an inert solvent medium and hydrolyzing the reaction product; where

is a tertiary amine function such as pyrrolidino, morpholino, piperidino or di-(lower alkyl)-amino, X represents a lithium atom or a magnesium halide residue such as —MgCl, —MgBr or —MgI, and R and Y are as defined above. The conditions for the reaction with the phenyl metal derivative may be varied considerably. For example, the phenyl metal derivative is used in the amount theoretically required to react with the 20-keto function and the active hydrogens of the 11β-hydroxy- (where present) and 21-hydroxy groups, but a substantial excess may be used and is in fact preferred. The reaction temperature may be varied from about 0 to 100° C., the range of 35 to 50° C. being preferred. At this preferred temperature range, the reaction is ordinarily complete in short periods ranging from about one to 24 hours. As a solvent for the reaction one may use ethers such as diethyl ether, tetrahydrofuran and diethylene glycol dimethyl ether, hydrocarbons such as heptane and benzene; similar inert solvents and mixtures of such solvents. The preferred solvents are ether and heptane-ether mixtures. The hydrolysis step is carried out by treating the reaction product with an aqueous medium which may be either neutral, acidic or basic. A preferred reagent is aqueous acetic acid buffered with sodium acetate. The hydrolysis is conveniently carried out by treating the reaction product in situ, i.e., without isolating the same from the reaction mixture. The starting materials of Formula III, which are novel substances, may be prepared by reaction of a methanolic solution of corticosterone or desoxycorticosterone with an equivalent of a secondary amine such as pyrrolidine, morpholine piperidine or a di-(lower alkyl)amine.

According to another embodiment of the invention, benzoylandrostene compounds of Formula II above are produced by subjecting phenylpregnene compounds of Formula I above (where R' is hydrogen and R and Y are as defined above) to cleavage with periodic acid ($H_5IO_6$) in the molecular ratio of about 1:2. The reaction is ordinarily carried out at temperatures in the range from about zero to 30° C. and preferably about zero to 5° C. As a solvent medium, one may use such solvents as ethanol, acetic acid, dioxane, tetrahydrofuran or an aqueous mixture thereof. A preferred solvent is aqueous dioxane. The reaction is ordinarily complete in about 6 to 24 hours.

As a further embodiment of the invention, phenylpregnene compounds of formula I where R' is a lower alkanoyl group are produced by acylating the corresponding phenylpregnene-20,21-diols (where R' of Formula I is hydrogen and R and Y are as defined above). Acylation is accomplished by reacting the diol compound with at least one equivalent, and preferably an excess, of an acylating agent such as an acyl halide in the presence of at least one equivalent of tertiary amine catalyst, or a carboxylic acid anhydride with or without tertiary amine catalyst, or a similar acylating agent. Any of various tertiary amine catalysts such as pyridine or triethylamine may be used. As a solvent for the acylation, one may employ tertiary amine in excess or an inert medium such as diethyl ether, benzene, tetrahydrofuran, N,N-dimethylformamide and the like. The reaction temperature is not critical and may be varied widely, e.g., in the range from about 0 to 100° C. and more preferably from 20 to 30° C. The reaction is ordinarily complete in from 6 to 48 hours at these temperatures and in about 16 to 18 hours at the preferred temperature range.

The products of the invention possess useful pharmacological properties. In particular, when administered by the oral or parenteral route in standard assay procedures, they exhibit myotropic activity and yet are desirably free of androgenic side-effects. Hence, the products have application in suitable dosage form as myotropic agents for oral or parenteral administration. The compounds are also useful as chemical intermediates for the production of other steroids having fused heterocyclic rings.

The invention is illustrated by the following examples.

Example 1

(a) A solution of 5.0 g. of 3-(pyrrolidyl)-pregna-3,5-diene-20-one-21-ol in 100 ml. of ether is added to a solution of phenyl lithium (prepared from 2.5 g. of lithium and 8 ml. of bromobenzene) in 50 ml. of ether and the resulting solution stirred and heated under reflux overnight. The cooled solution is then treated with a solution of 8 g. of sodium acetate and 60 ml. of acetic acid in 300 ml. of water, and the resulting two-phase mixture stirred and heated under reflux for an additional 3 hours. After cooling, the layers are separated, and the ether layer is washed with water, dilute hydrochloric acid, and again with water, and then is dried over magnesium sulfate. The ether solution is concentrated to dryness and the residue recrystallized from ethyl acetate. The product is 20-phenylpregn-4-ene-3-one-20,21-diol; M.P. 237–239° C. after recrystallization from methanol.

(b) The starting material for (a) is prepared as follows: A warm solution of 10.0 g. of pregn-4-ene-3,20-dione-21-ol (desoxycorticosterone) in 25 ml. of methanol is treated with 6 ml. of pyrrolidine. After 10 minutes, the solution is placed in a refrigerator and left overnight. The precipitated product, 3-(N-pyrrolidyl)-pregna-3,5-diene-20-one-21-ol, is collected by filtration, washed with cold methanol, and dried; M.P. 158–161° C.

Example 2 o-Anisyllithium solution (prepared by treating a solution of 28.4 g. of o-bromoanisole in 200 ml. of ether with 60 ml. of a 2.5 M solution of butyl lithium in heptane and allowing the resulting warm solution to cool for ten minutes) is added to a solution of 4.0 g. of 3-(pyrrolidyl)-pregna-3,5-diene-20-one-21-ol in 800 ml. of anhydrous ether. The resulting solution is heated under reflux for 18 hours. The cooled solution is then treated with a solution of 8 g. of sodium acetate and 60 ml. of acetic acid in 325 ml. of water, and the resulting two-phase mixture is stirred and heated under reflux for an additional 3 hours. After cooling, the layers are separated, and the ether layer is washed successively with water, dilute hydrochloric acid, and water, and is then dried over magnesium sulfate. The ether solution is concentrated to an oil which on trituration with methanol yields the desired product, 20-(o-methoxyphenyl)-pregn-4-ene-3-one-20,21-diol; M.P. 134–137° C. after recrystallization from methanol.

Example 3

A solution of 1.07 g. of 20-phenylpregn-4-ene-3-one-20,21-diol in 85 ml. of dioxane is cooled to 0° C. and treated with a solution of 1.10 g. of paraperiodic acid in 25 ml. of water. The solution is kept at 0° C. overnight, poured into dilute potassium carbonate solution, and the product which separates, 17β-benzoyl-androst-4-ene-3-one, is recovered by filtration, washed with water, dried, and recrystallized from methanol; M.P. 182–184° C.

Example 4

A solution of 1.10 g. of 20-(o-methoxyphenyl)-pregn-4-ene-3-one-20,21-diol in 85 ml. of dioxane is cooled to 5° C. and treated with a solution of 1.1 g. of paraperiodic acid in 25 ml. of water. The solution is kept at 5° C. for 16 hours and is then diluted with water. The product which separates, 17β-o-anisoylandrost-4-en-3-one, is collected by filtration and dried; M.P. 187–188° C. after recrystallization from ethyl acetate.

Example 5

A solution of 0.75 g. of corticosterone in 5 ml. of methanol is treated with 2 ml. of pyrrolidine and warmed on the steam bath until a heavy precipitate is formed. The solution is cooled, and the solid product, 3-(N-pyrrolidyl)-pregna-3,5-diene-11β,21-diol-20-one, is collected by filtration, washed with cold methanol and dried. A solution of 0.80 g. of 3-(N-pyrrolidyl)-pregna-3,5-diene-11β,21-diol-20-one in 50 ml. of tetrahydrofuran is added to a solution of 0.075 moles of phenyl lithium in 200 ml. of tetrahydrofuran. The resulting solution is heated under reflux for 90 minutes and allowed to stand at room temperature overnight. A solution of 1.6 g. of sodium acetate and 12 ml. of acetic acid in 60 ml. of water is added, and the resulting solution is heated under reflux an additional 3 hours. The organic solvent is removed by distillation under reduced pressure, and the residue is extracted with ether. The ether extracts are combined, washed with water, dried over magnesium sulfate, and concentrated to give the desired product, 20-phenyl-pregn-4-ene-3-one-11β,20-21-triol.

Example 6

A solution of 0.25 g. of 20-phenylpregn-4-ene-3-one-11β-20,21-triol in 20 ml. of dioxane is cooled to 0° C. and treated with a solution of 0.91 g. of paraperiodic acid in 5 ml. of water. The solution is kept at 5° C. for 16 hours and is then poured into water. The mixture is extracted with ethyl acetate, and the combined extracts washed with water, dried over magnesium sulfate, and concentrated to dryness. The residual product is 17β-benzoyl-11β-hydroxyandrost-4-ene-3-one; M.P. 247–249° C. after recrystallization from ether.

Example 7

A solution of 2.12 g. of 3-(N-pyrrolidyl)-pregna-3,5-diene-20-one-21-ol in 450 ml. of ether is added to a solution of o-tolylmagnesium bromide (prepared from 3 g. of magnesium and 21.4 g. of o-bromotoluene) in 50 ml. of ether. The resulting solution is stirred and heated under reflux overnight. The cooled solution is then treated with a solution of 4 g. of sodium acetate and 30 ml. of water in 300 ml. of water, and the resulting two-phase mixture is stirred and heated under reflux for an additional 3 hours. After cooling, the layers are separated, and the ether layer is washed successively with water, dilute hydrochloric acid, and water, and is then dried over magnesium sulfate. The ether solution is concentrated to dryness, and the residual product, 20-(o-tolyl)-pregn-4-ene-3-one-20,21-diol, is purified by recrystallization first from ethyl acetate-heptane and then from aqueous methanol.

Example 8

A solution of 0.93 g. of 20-(o-tolyl)-pregn-4-ene-3-one-20,21-diol in 80 ml. of dioxane is cooled to 5° C. and treated with a solution of 1.0 g. of paraperiodic acid in 8 ml. of water. The solution is kept at 0° C. for 20 hours and is then poured into water. The desired product, 17β-o-tolylandrost-4-ene-3-one, is isolated by filtration, washed with water, dried, and recrystallized from ethyl acetate.

Example 9

A solution of 2.0 g. of 3-(N-pyrrolidyl)-pregna-3,5-diene-20-one-21-ol in 400 ml. of ether is added to a solution of o-chlorophenylmagnesium bromide (prepared from 3 g. of magnesium and 23.2 g. of o-bromochlorobenzene) in 80 ml. of ether. The resulting solution is stirred and heated under reflux overnight. The cooled solution is then treated with a solution of 4 g. of sodium acetate and 30 ml. of acetic acid in 300 ml. of water, and the resulting two-phase mixture is stirred and heated under reflux for an additional 3 hours. After cooling, the layers are separated, and the ether layer is washed successively with water, dilute hydrochloric acid, and water, and is then dried over magnesium sulfate. The ether solution is concentrated to dryness, and the residual product, 20 - (o-chlorophenyl)-pregn-4-ene-3-one-20,21-diol, is crystallized first from benzene-hexane and then from acetone-hexane.

Example 10

A solution of 0.86 g. of 20-(o-chlorophenyl)-pregn-4-ene-3-one-20,21-diol in 75 ml. of dioxane is cooled to 5° C. and treated with a solution of 0.94 g. of paraperiodic acid in 20 ml. of water. The solution is kept at 0–5° C. overnight and is then poured into water. The precipitate is filtered, washed with water, dried, and recrystallized from aqueous methanol. The crystalline product is 17β-(o-chlorobenzoyl)-androst-4-ene-3-one.

Example 11

A solution of 0.50 g. of 20-phenylpregn-4-ene-3-one-20,21-diol in 10 ml. of dry pyridine is treated with 2 ml. of acetic anhydride. The resulting solution is left overnight at room temperature and is then poured into water. The desired product, 20-phenylpregn-4-ene-3-one-20,21-diol-21-acetate, which separates as a precipitate, is collected, washed with water, and recrystallized from heptane.

Example 12

A solution of 0.87 g. of 20-(o-methoxyphenyl)-pregn-4-ene-3-one-20,21-diol in 25 ml. of dry pyridine is treated with 5 ml. of n-butyric anhydride. The resulting solution is left overnight at room temperature and is then poured into water. The resulting gummy precipitate is extracted with ether, and the combined extracts are washed in succession with dilute hydrochloric acid, water, sodium bicarbonate solution, and water. The ether solution is then dried over magnesium sulfate and concentrated to an oil. The desired product, 20-(o-methoxyphenyl)-pregn-4-ene-3-one-20,21-diol-21-butyrate, is obtained in pure form by crystallizing the oil from petroleum ether and recrystallizing from ether-petroleum ether.

I claim:
1. A compound of the group consisting of 20-phenylpregn-4-ene-3-one-20,21-diols and 17β-benzoylandrost-4-ene-3-ones having the respective formulas

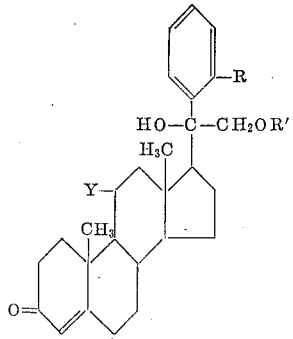

and

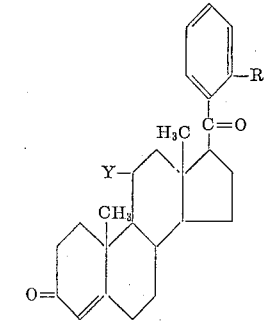

where R is a member of the group consisting of hydrogen, chlorine, methyl and methoxy, R' is a member of the group consisting of hydrogen and lower alkanoyl, and Y is a member of the group consisting of hydrogen and hydroxyl.

2. 20-phenylpregn-4-ene-3-one-20,21-diol.
3. 20-(o-methoxyphenyl)-pregn-4-ene-3-one-20,21-diol.
4. 20-(o-tolyl)-pregn-4-ene-3-one-20,21-diol.
5. 20-(o-chlorophenyl)-pregn-4-ene-3-one-20,21-diol.
6. 17β-o-anisoylandrost-4-en-3-one.
7. 17β-(o-chlorobenzoyl)-androst-4-en-3-one.
8. 17β-benzoylandrost-4-ene-3-one.
9. 17β-benzoyl-11β-hydroxyandrost-4-ene-3-one.

References Cited by the Examiner
UNITED STATES PATENTS 2,184,299 12/1939 Hildebrandt _____ 260—397
2,389,325 11/1945 Reichstein _____ 260—397.4

LEWIS GOTTS, *Primary Examiner.*

ELBERT L. ROBERTS, *Examiner.*